United States Patent [19]

Pinkham

[11] 4,277,975
[45] Jul. 14, 1981

[54] DIGITAL THERMOMETER

[75] Inventor: Clinton L. Pinkham, New Hartford, N.Y.

[73] Assignee: General Electric Company, New York, N.Y.

[21] Appl. No.: 93,841

[22] Filed: Nov. 13, 1979

[51] Int. Cl.³ .............................................. G01K 7/24
[52] U.S. Cl. .............................................. 73/362 AR
[58] Field of Search ...................... 73/362 AR, 362 SC

[56] References Cited

U.S. PATENT DOCUMENTS

| | | | |
|---|---|---|---|
| 4,112,764 | 9/1978 | Turner | 73/362 AR |
| 4,114,446 | 9/1978 | Walsh | 73/362 AR |
| 4,117,722 | 10/1978 | Helmstetter | 73/362 AR |
| 4,150,573 | 4/1979 | Iinuma et al. | 73/362 AR |
| 4,165,642 | 8/1979 | Lipp | 73/362 SC |
| 4,224,537 | 9/1980 | Glazer | 73/362 SC |

*Primary Examiner*—Daniel M. Yasich

*Attorney, Agent, or Firm*—Carlos Nieves; George R. Powers; Leonard J. Platt

[57] ABSTRACT

Apparatus for sensing and displaying temperature at a site includes a sensor which provides a first current related to temperature at the site, and a circuit for generating a predetermined current. The apparatus also includes a capacitance responsive to a second current having a value proportional to the difference between the first current and the predetermined current for generating a voltage; and means responsive to the generated voltage for discharging the capacitance to a predetermined voltage level when the voltage exceeds a selected reference level and for providing a signal indicating each time the voltage exceeds the reference level. The signal is periodic with a frequency related to sensed temperature and digital display means responsive to the frequency of the signal provide a numerical indication of temperature sensed. The values of the predetermined current, the capacitance and the periodic voltage change across the capacitance are selectable to indicate temperature in degrees Fahrenheit or Celsius.

11 Claims, 5 Drawing Figures

DIGITAL THERMOMETER

BACKGROUND OF THE INVENTION

1. Field of the Invention

The subject invention relates to apparatus for sensing and numerically displaying temperature in degrees Celsius or degrees Fahrenheit.

2. Description of Prior Art

Persons skilled in the art to which the invention relates are at least constructively aware of the digital thermometer disclosed in U.S. Pat. No. 4,117,722, issued to P. M. Helmstetter on Oct. 3, 1978. The patent describes apparatus wherein a thermistor, associated with circuitry which compensates for its nonlinear temperature versus resistance characteristic, is used to sense temperature. In the apparatus, the thermistor is also associated with circuitry to provide a temperature related current to a capacitor. The current charges the capacitor until threshold sensitive circuitry is initiated to interrupt the flow of the current to the capacitor and to supply an opposing and constant current which rapidly lowers the voltage across the capacitor until a predetermined level is reached. When the predetermined level is reached, the opposing current is interrupted and the temperature related current is again allowed to flow to the capacitor. The rise time of the voltage across the capacitor is dependent on the magnitude of the temperature related current and, therefore, the charging and discharging repeats itself with a frequency related to the temperature at the site of the thermistor. The threshold circuitry includes a flip-flop which provides a signal at said frequency and the signal is coupled to a counter by a gate which is open for a first period of time if a measure of temperature in degrees Celsius is desired or for a second period of time if a measure of temperature in degrees Fahrenheit is desired. The first and second predetermined periods are related to the 9/5 ratio which relates Fahrenheit and Celsius degrees. The counter includes a selectable preset count which is used to compensate for the 32° offset between Fahrenheit and Celsius temperature scales. A latch coupled to the counter drives a digital display of the seven-segment type and provides a visible indication of temperature.

SUMMARY OF THE INVENTION

It is an object of the present invention to provide a digital thermometer which can be calibrated readily, is relatively inexpensive to manufacture, and can be used to provide temperature readings in degrees Fahrenheit or Celsius.

The invention herein may be described broadly as apparatus for sensing and displaying temperature. The apparatus comprises a circuit including a temperature sensor for providing a first current related to the temperature at the site of the sensor; means for generating a predetermined current; and a capacitor responsive to a second current having a value proportional to the difference between the first current and the predetermined current for generating a voltage. In addition, the apparatus includes means responsive to the generated voltage for discharging the capacitor to a predetermined level when the voltage exceeds a selected reference level and for providing a signal indicating each time the voltage exceeds the reference level, whereby said signal is periodic with a frequency related to temperature sensed; and display means responsive to the frequency of said signal for providing a numerical indication of the temperature sensed.

With known digital display means responsive to frequency, the relationship between frequency input to digital readout is fixed. A feature of the invention resides in that the predetermined current may be selected so that the numerical indication accurately represents the temperature sensed in either the Celsius of Fahrenheit scale systems.

Another feature of the invention resides in that Celsius or Fahrenheit indications can be provided by changing, in the apparatus, the value of the capacitance provided by the capacitor and/or the magnitude of the voltage range allowed across the capacitor by the reference level and the predetermined discharge level.

BRIEF DESCRIPTION OF THE DRAWINGS

The above-mentioned and other objects and features of the invention will become apparent by reference to the following description in conjunction with the accompanying drawing, in which.

DESCRIPTION OF PREFERRED EMBODIMENTS

In each of the embodiments described hereafter, sensed temperature is used to generate a periodic signal having a temperature dependent frequency. The periodic signal is used to drive display means so as to indicate the temperature numerically. The temperature dependent frequencies are provided according to the relationships referred to in the next paragraph.

Figure 1:
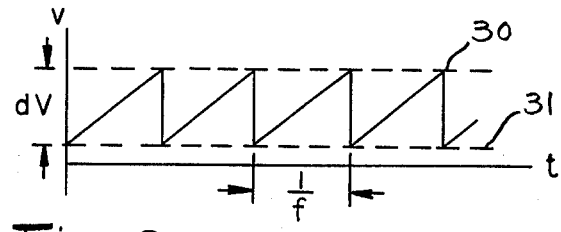
FIG. 1 is a waveform which is useful in explaining the invention.

With reference to FIG. 1, the sawtooth waveform shown represents a voltage, as a function of time, across a capacitor when it is periodically charged with a constant current to a reference voltage level 30 and is immediately discharged to a predetermined voltage level 31. The frequency of the periodic voltage across the capacitor is obtainable from the relationship:

$$f = I_2 / C\, dV$$

where
 f = frequency in hertz/sec.;
 C = the value of the capacitor in farads; and
 dV = the difference between the reference voltage level and the predetermined voltage level.
 $I_2$ = charging current If, as will appear, current $I_2$ is proportional to the difference between a current $I_1$, which is proportional to temperature at a site, and a current $I_k$ which has a predetermined value, the frequency is given by the relationship;

$$f = k_1 I_1 - K_2$$

where $k_1$ and $k_2$ are inversely proportional to C dV and $k_2$ is directly proprotional to $I_k$. Thus, it may be seen that the frequency is directly related to temperature and to a fixed value which is related to the predetermined current. In practice, the predetermined current is selected to match circuitry having the described temperature to frequency relationship to a frequency to digital display device, whereby the readout of the device is in either degrees Celsius or degrees Fahrenheit.

Figure 2:
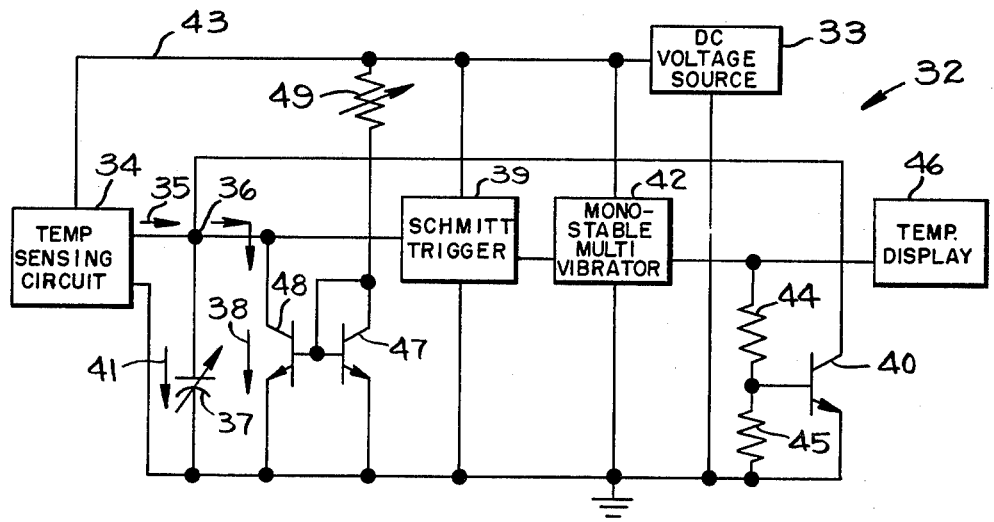
FIG. 2 is a schematic block diagram of apparatus for sensing and displaying temperature, according to the invention.

Apparatus 32 for sensing and displaying temperature, according to the foregoing relationship, is shown in FIG. 2. Referring to FIG. 2, the apparatus includes a DC voltage source 33 which supplies power to a temperature sensing circuit 34. The circuit includes a temperature sensor in a temperature circuit, such as an LM334, (not shown) for providing a current, indicated by arrows 35, related to the temperature at the site of the sensor. Current 35 is directed towards a current node 36 which is coupled to ground by a variable capacitor 37. Node 36 is also connected to means for generating a predetermined current 38 and current 38 is drawn from the node. Although node 36 is connected to a Schmitt trigger 39 (regenerative comparator) and the transistor 40 of electronic switch means, a current 41 which is equal to the difference between current 35 and current 38 charges capacitor 37. Capacitor 37 charges until the voltage across it exceeds a reference level which triggers the Schmitt circuit. In turn, the Schmitt circuit triggers a monostable multivibrator 42 which provides a pulse having a width which is small relative to the time it takes for the voltage across the capacitor to rise to the reference level from a predetermined level. As may be seen, the Schmitt trigger and multivibrator are supplied power by the voltage source 33. The output of the multivibrator 42 is coupled to ground by a pair of series connected resistors 44 and 45 and, as is more fully described hereafter, to temperature display 46. Transistor 40 has its base connected to a point between resistors 44 and 45, has its emitter grounded, and has its collector connected to node 36. When the multivibrator is in a stable state, transistor 40 is biased into cutoff and, when the multivibrator puts out its narrow pulse, it turns the transistor on, thereby providing a discharge path for charge which has accumulated on capacitor 37. Capacitor 37 discharges to the predetermined level, which in this example is a few tenths of a volt. Persons skilled in the electronic arts will appreciate that this value may be varied by controlling the width of the pulse provided by the multivibrator. In essence, transistor 40 and resistors 44 and 45 make up an electronic switch which is closed whenever the multivibrator 42 puts out a pulse. After capacitor 37 has been discharged to the predetermined level, transistor 40 is biased into cutoff and the capacitor is again charged towards the reference level. Thus, the cycle described repeats itself over and over again with a frequency directly related to current 41, and inversely related to the product of the capacitance of capacitor 37 and the difference between the reference voltage and the predetermined level.

The means for generating a predetermined current 38 includes a current mirror amplifier. The amplifier includes transistors 47 and 48 connected at their emitter electrodes to ground. Transistor 47 is provided with collector-to-base feedback which regulates the amplitude of its collector current to a value related to the magnitude of the voltage provided by source 33 on line 43 divided by the amount of resistance provided by the variable resistor 49 coupling transistor 47 to source 33. The base-emitter potential of transistor 47 is applied to the base-emitter junction of transistor 48 causing the collector current 38 to be inversely related to the setting of resistor 49. Since current 35 is related to temperature, the frequency with which capacitor 37 charges and discharges can be controlled at least over a limited range, with variable resistor 49.

The narrow pulses produced by multivibrator 42 occur with the same frequency as is associated with the charging and discharging of the capacitor 37. The pulses are applied to display 46 which includes a gate that is periodically enabled for a one second interval. During the one second interval, the pulses are transmitted to a counter having a preset counter of −160. At the end of the one second interval, the content of the counter is displayed digitally. The digital number displayed is then equal to the frequency of the pulses in Hz minus 160. Since the frequency is related to sensor temperature, the digitally displayed number can be adjusted to show the temperature in degrees Fahrenheit or Celsius at the site of the sensor 34. Adjustments of temperature indications may be made by changing the value of resistor 49, the value of capacitor 37 or the magnitude of the voltage source 33. The preset count is used to provide a temperature read-out including negative temperatures.

Figure 4:
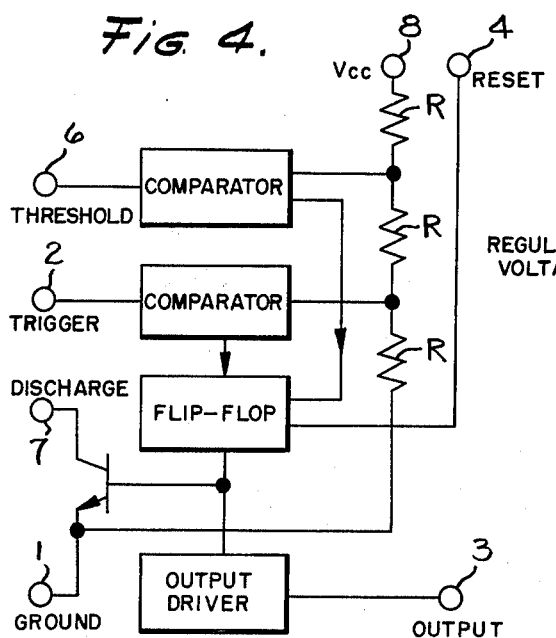
FIG. 4 is a schematic block diagram of a 555 timer used in the apparatus shown in FIG. 3.

Merchants currently offer radios having digital displays for indicating time or the assigned operating frequency of a tuned station. In such radios, since the digital display does not need to indicate the time or frequency continuously, the display can be shared with apparatus for sensing and selectively displaying temperature at the site of a sensor in degrees Fahrenheit or degrees Celsius. An embodiment incorporating this aspect of the invention is shown in FIGS. 3 and 4 and is described below.

Figure 3:
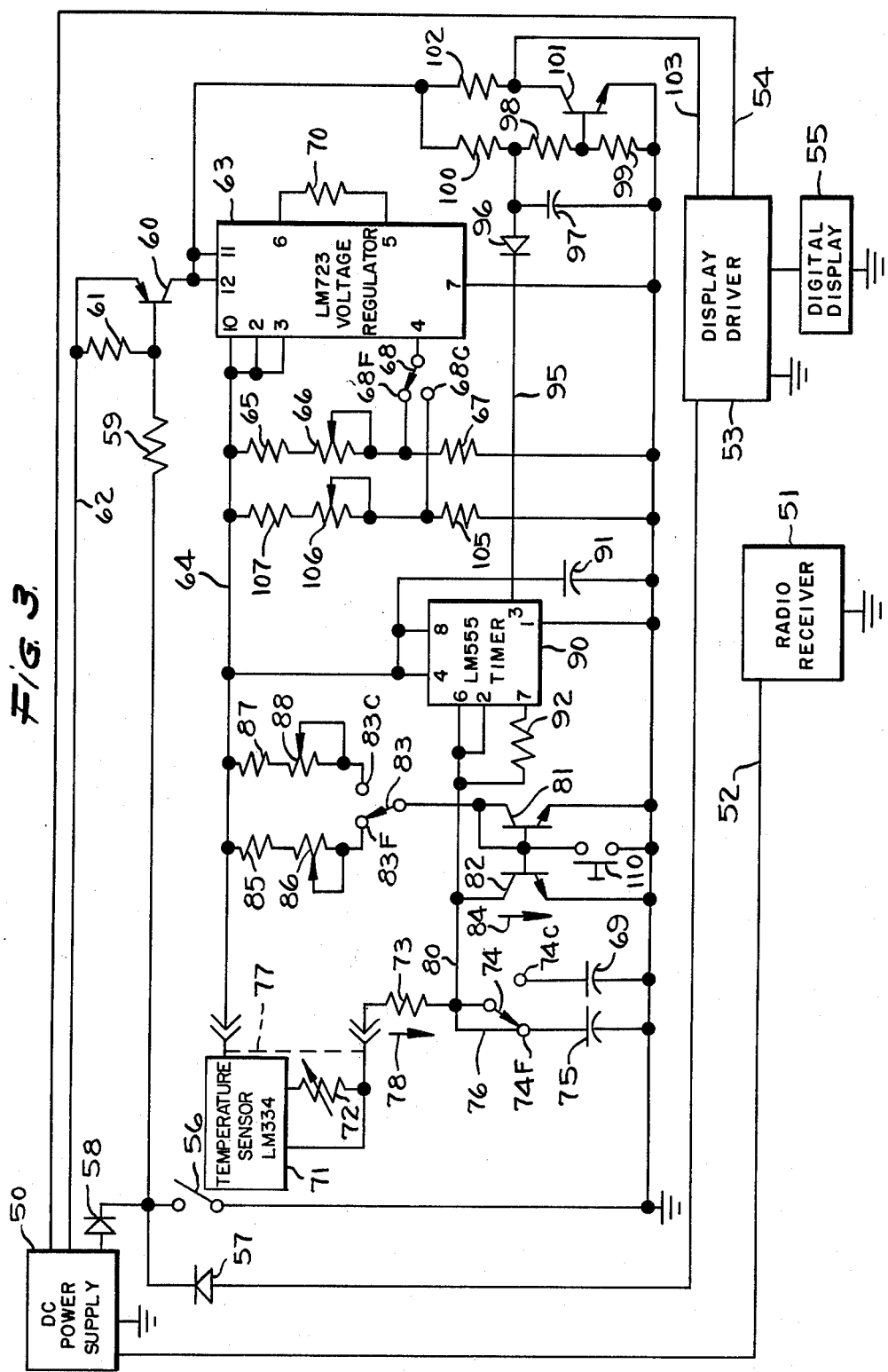
FIG. 3 is a schematic diagram of apparatus for sensing and displaying temperature, selectively, in degrees Fahrenheit or degrees Celsius.

Referring to FIG. 3, circuitry for a digital clock radio includes a DC power supply 50, a radio receiver 51 coupled to the power supply by a wire 52 and a display driver 53 which is coupled to the supply by a wire 54. Driver 53 provides a digital display 55 with signals which cause it to indicate the time of day. In addition to circuitry for turning the radio receiver on and off (not shown), the clock radio circuitry includes a switch 56 connected at one side to ground and at its other side to the cathode of a diode 57, to the cathode of a diode 58, and to one end of a bias resistor 59. The anode of diode 57 is connected to driver 53 and when switch 56 is closed the time of day function is disabled and, as more fully discussed hereafter, the driver is set to process temperature relatd signals. Resistor 59 is part of a switching circuit. More particularly, the other end of resistor 59 is connected to the base of a transistor 60 and to an end of a bias resistor 61. The other end of resistor 61 and the emitter of transistor 60 are connected to power supply 50 by wire 62 and the collector of transistor 60 is coupled to ground by a voltage regulator circuit. In the subject embodiment about 18 volts is provided on line 62. The supply 50 and the regulator circuit make up a voltage source used to supply power to many components of the apparatus. In this circuit, when switch 56 is closed, resistor 59 is grounded and the apparatus is turned on and, when switch 56 is open, the apparatus is off. The anode of diode 58 is connected to circuitry (not shown) in the power supply which turns off the voltage normally supplied over wire 52 and, therefore, the radio receiver is turned off whenever switch 56 is closed. The receiver, if otherwise on, is turned off when the apparatus is turned on because the apparatus generates signals which would result in undesirable noise in the receiver.

The voltage regulator circuit includes a voltage regulator integrated circuit 63, such as is sold in a dual-in-line package with the designation LM723 by the National Semiconductor Corporation. Circuit 63 is shown in FIG. 3 as a box including numbers used by the manufacturer to represent accessible terminals of the package to which associated components may be attached.

In the regulator circuit, terminal 7 is grounded and power is supplied to circuit 63 at terminals 11 and 12 via the collector of transistor 60. Terminals 2, 3, and 10 are connected to a wire 64 and to series connected resistors 65, 66, 67, resistor 67 also being connected to ground. The connection between resistors 66 and 67 is also connected to a terminal 68F of a switch 68 for selectable connection, as is shown, to terminal 4 of circuit 63. The value of resistance connected between terminals 4 and 10, and the value of resistance connected between terminals 4 and 7 determines the magnitude of the regulated voltage supplied on wire 64 and, as indicated in data sheets supplied by the manufacturer of circuit 63, the value of a resistor 70 which is connected between terminals 5 and 6 to minimize temperature drift in circuit 63. Resistor 66 is variable to provide precise control over the value of the regulated voltage.

Wire 64 is connected in series with a temperature sensor 71, a resistor 73 which protects against current surges, the arm of a switch 74, and a capacitor 75 located between a terminal 74F of the switch and ground. The capacitor 75 and resistor 73 are kept in series regardless of the position of the arm of switch 74 by a shorting strap 76. As will be referred to hereafter, another terminal 74C of switch 74 is connected to ground by a capacitor 69. Temperature sensor 71 is a 3-terminal adjustable current source which is sold by National Semiconductor under the designation LM334 and in operation provides an output current, indicated by arrow 78, directly related to absolute temperature at its location or site. A variable resistor 72 is used to calibrate the output current at a specific temperature. To calibrate the LM334 at, for example, 25 degrees Celsius, the value of resistor 72 is nominally set to equal 67.7 millivolts divided by the desired current.

The arm of switch 74 is connected by a wire 80 to a current mirror amplifier and to a timing device 90 sold by National Semiconductor under the designation LM555 timer. The amplifier includes transistors 81 and 82 and the emitters of these transistors are connected to ground. Transistor 81 is provided with collector-to-base feedback which regulates the amplitude of its collector current to a value related to the magnitude of the regulated voltage on wire 64 divided by a selectable resistance coupled by a switch 83 to the collector of transistor 81. The base-emitter potential of transistor 81 is applied to the base-emitter junction of transistor 82 and causes the collector current, indicated by arrow 84, to be inversely related to the value of the selectable resistance. As is shown, one selectable resistance is connected between wire 64 and terminal 83F of switch 83 and includes a fixed resistor 85 in series with a variable resistor 86. As will be referred to hereafter, another of the selectable resistances is connected between wire 64 and terminal 83C of switch 83 and includes a fixed resistor 87 in series with a variable resistor 88.

Figure 5:
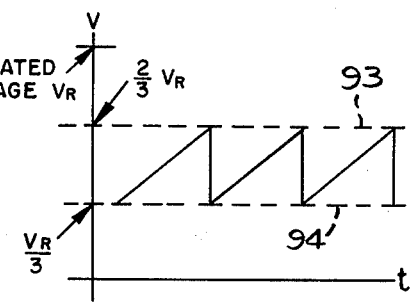
FIG. 5 is a waveform of a voltage developed across a capacitor to trigger the timer.

In FIG. 3, timer 90 is shown as a rectangle within which numbers representative of terminals are shown, the numbers being positioned to indicate circuit connections. The same numbers are also shown in FIG. 4 which sets forth in block diagram form the internal components of the timer. As may be seen in FIG. 3, terminals 4 and 8 of timer 90 are connected to the regulated voltage on wire 64 and to a bypass capacitor 91. Terminal 1 is grounded, threshold and trigger terminals 6 and 2 are connected to line 80, and terminal 7 is coupled by a resistor 92 to line 80. Referring to FIGS. 3 and 5, with switch 74 as shown, the current from the temperature sensor less the current drawn by transistor 82 charges the capacitor 75. Under relatively stable temperature conditions at the sensor 71, the voltage across capacitor 75 rises linearly until the threshold or reference level 93 associated with terminal 6 is exceeded. This level is equal to two-thirds of the value of the regulated voltage applied to terminal 8. When the threshold level is exceeded, a flip-flop of the timer turns on a transistor connected internally to terminal 7 and capacitor 75 rapidly discharges. Discharging is terminated when the voltage across the capacitor drops to a predetermined level 94 equal to one-third the value of the regulated voltage. The predetermined level is sensed at terminal 2 and is used to turn off the transistor associated with terminal 7. With the transistor off, the capacitor 75 is recharged and undergoes another cycle such as described. In fact, the voltage across the capacitor is periodic with a frequency directly related to the capacitor charging current and inversely related to the value of the capacitor multiplied by one-third the value of the regulated voltage. During the discharge time of the capacitor 75, terminal 3 puts out a narrow pulse on wire 95. Wire 95 is connected to the cathode of a diode 96 whose anode is connected by a capacitor 97 to ground, by series-connected resistors 98 and 99 to ground, and by a resistor 100 to the collector of transistor 60. A point common to resistors 98 and 99 is connected to the base of a transistor 101 having a grounded emitter and a collector coupled to the collector of transistor 60 by a resistor 101. The diode 96, capacitor 97 and the effective resistance across the capacitor, so far as the base of transistor 101 is concerned, effectively stretch out the pulses provided via wire 95 and transistor 101 amplifies the stretched-out pulses. The amplified periodic signal on the collector of transistor 101 is coupled by a wire 103 to the display driver 53. Driver 53 is an integrated circuit manufactured under part number 247A 4667-8455 by AMI, and includes a gate which, when switch 56 is closed, is periodically opened for a second to transmit the signal on wire 103 to a counter having a preset count of $-160$. The final count is used to drive digital display 55, which in the subject embodiment includes a vacuum fluorescent panel such as is sold by Nippon Electric Company under part number FIP5D15AS. With the arms of switches 68, 83, 74 connected to terminals 68F, 83F, 74F, respectively, resistors 66 and 86 may be adjusted to provide approximately 12 volts on wire 64 and a numerical indication of degrees Fahrenheit at the display.

Terminal 68C of switch 68 is coupled to ground by a resistor 105 and to wire 64 by a variable resistor 106 in series with a resistor 107. When the arm of switch 74 is connected to terminal 74C, capacitor 69 is placed in parallel with capacitor 75. In this example, capacitors 69 and 75 have equal values and to provide a 5/9 relationship of the frequency produced on line 95 when the arms of switches 68 and 74 are moved from terminals 68F and 74F into contact with terminals 68C and 74C, the values of resistors 105, 106, 107 are selected to provide a voltage on line 64 which is slightly less than when arm 68 is connected to terminal 68F. A nominal value for the voltage is 10.5 volts. When the arms of switches 68 and 74 are moved from terminals 68F and 74F to terminals 68C and 74C, the arm of switch 83 is also moved from terminal 83F to 83C and provides a fixed frequency offset at wire 95. The offset is related to the 32° difference between Celsius and Fahrenheit scales at the freezing point of water. Thus, switches 68, 74 and 83 are used to provide temperature indications at the display in either degrees Celsius or degrees Fahrenheit.

To allow the temperature sensor to be moved about with respect to its associated circuitry which is contained in a housing (not shown) the temperature sensor is connected by about 20 feet of wire to a plug which mates with a jack 77 supported by the housing and connected to the circuitry.

When the apparatus is to be produced on a mass production basis, calibration may be achieved by replacing the sensor 71 with a known current source to simulate a temperature. To calibrate Celsius readings, the arms of switches 68, 74 and 83 are connected to terminals 68C, 74C and 83C, respectively, and with the base of transistors 81 and 82 shorted to ground by normally open switch 110 resistor 106 may be adjusted to provide a predetermined readout on the display. Thereafter, with switch 110 open, resistors 88 may be adjusted to provide a readout indicating the simulated temperature in degrees Celsius. To calibrate Fahrenheit readings, the arms of switches 68, 74 and 83 are connected to terminals 68F, 74F and 83F, respectively. With switch 110 shorted, resistor 66 is adjusted to provide another predetermined readout on the display and, subsequently, with switch 110 open, resistor 86 is adjusted to provide a readout indicating the simulated temperature in degrees Fahrenheit.

For the embodiment disclosed in FIG. 3, the designated components may have values as follows:

| Capacitor | Value | Capacitor | Value |
|---|---|---|---|
| 69 | 0.1 uf | 91 | 10 uf |
| 75 | 0.1 uf | 97 | 0.04 uf |

| Resistor | Value | Resistor | Value |
|---|---|---|---|
| 59 | 20K ohms | 87 | 110K ohms |
| 61 | 120K ohms | 88 | 0–15K ohms |
| 65 | 2K ohms | 92 | 510 ohms |
| 66 | 0–1K ohms | 98 | 15K ohms |
| 67 | 3.9 ohms | 99 | 10K ohms |
| 70 | 1.2K ohms | 100 | 56K ohms |
| 72 | 300 ohms | 102 | 10K ohms |
| 73 | 5.1K ohms | 105 | 3.9K ohms |
| 85 | 82K ohms | 106 | 0–1K ohms |
| 86 | 0–15 ohms | 107 | 1.8K ohms |

The apparatus described above may be modified by persons skilled in the art to which the invention pertains in ways which are consistent with the spirit of the invention. Therefore, it should be understood that the description herein of preferred embodiments, according to the invention, have been set forth as examples thereof and should not be construed or interpreted to limit the scope of the claims which follow and define the invention.

I claim:

1. Apparatus for sensing and displaying temperature comprising:
   (a) a circuit including a temperature sensor for providing a first current related to the temperature at the site of the sensor;
   (b) means for generating a predetermined current;
   (c) a capacitor responsive to a second current having a value proportional to the difference between the first current and the predetermined current for generating a voltage;
   (d) means responsive to the generated voltage for discharging the capacitor to a predetermined level when the voltage exceeds a selected reference level and for providing a signal indicating each time the voltage exceeds the reference level, whereby said signal is periodic with a frequency related to temperature sensed; and
   (e) display means responsive to the frequency of said signal for providing a numerical indication of the temperature sensed.

2. Apparatus as defined in claim 1 wherein said means for generating a predetermined current includes: a DC voltage source; a first transistor coupled to said circuit; a second transistor, the emitters of the first and second transistors being coupled to provide a common voltage at the emitters, the bases of the first and second transistors being coupled to the collector of the second transistor; and a load resistor coupled to the collector and the DC voltage source, whereby the predetermined current flows through the first transistor with a magnitude related to the value of the resistor and the DC voltage source.

3. Apparatus as defined in claim 2 wherein said means responsive to the generated voltage includes: a Schmitt trigger circuit set to respond when the generated voltage exceeds the reference level; a monostable multivibrator circuit coupled to the Schmitt trigger circuit to provide said signal and electronic switch means, responsive to said signal, for discharging the capacitor.

4. Apparatus as defined in claim 2 wherein said means responsive to the generated voltage includes a 555 timer.

5. Apparatus as defined in claim 4 wherein said DC voltage source includes a voltage regulator and means for varying the output voltage of the regulator between at least two levels, whereby a reference level is selected.

6. Apparatus for sensing and displaying temperature in degrees Fahrenheit or degrees Celsius, comprising:
   (a) a circuit including a temperature sensor for providing a first current related to the temperature at the site of the sensor;
   (b) means for generating a first predetermined current or a second predetermined current;
   (c) a first capacitor responsive to a second current having a value proportional to the difference between the current related to temperature and the first or second predetermined current for generating a voltage;
   (d) means for selectively connecting a second capacitor in parallel with the first capacitor;
   (e) means responsive to the generated voltage for discharging the capacitor to a predetermined level when the voltage exceeds a reference level and for providing a signal indicating each time the voltage exceeds the reference level, whereby said signal is periodic with a first frequency when the first predetermined current is generated and the second capacitor is not connected in parallel with the first capacitor and periodic with a second frequency when the second predetermined current is generated and the second capacitor is connected in parallel with the first; and (f) display means responsive to said signal, the display means providing a numerical indication of temperature calibrated in degrees Fahrenheit in response to the first frequency or a numerical indication of temperature calibrated in degrees Celsius in response to the second frequency.

7. Apparatus as defined in claim 6 wherein said means for generating a first predetermined current or a second predetermined current includes: a DC voltage source; a first transistor coupled to said circuit; a second transistor, the emitters of the first and second transistors being coupled to provide a common voltage at the emitters, the bases of the first and second transistors being coupled to the collector of the second transistor; a resistance coupling the collector to the DC voltage source, whereby the first predetermined current flows through the first transistor; and means for changing the resistance coupling the collector to the DC voltage source, whereby the second predetermined current flows through the first transistor.

8. Apparatus as defined in claim 7 wherein said means for selectively connecting the second capacitor includes a first section of a switch and said means for changing the resistance includes a second section of a switch, the first and second sections being coupled to provide simultaneous switching of the first and second sections.

9. Apparatus for sensing and displaying temperature in degrees Fahrenheit or degrees Celsius, comprising:

(a) a circuit including a temperature sensor for providing a first current related to the temperature at the site of the sensor;

(b) means for generating a first predetermined current or a second predetermined current;

(c) a capacitor responsive to a second current having a value proportional to the difference between the current related to temperature and the first or second predetermined currents for generating a voltage;

(d) means responsive to the generated voltage for discharging the capacitor to reduce its voltage by a first amount when the generated voltage exceeds a first selectable reference level or to reduce its voltage by a second amount when the generated voltage exceeds a second selectable reference level; the first and second reference levels being selectable in the alternative; and for providing a signal indicating each time the voltage exceeds the first or second reference level, whereby said signal is periodic with a first frequency when the first predetermined current is generated and said capacitor is discharged said first amount and the signal is periodic with a second frequency when the second predetermined current is generated and the capacitor is discharged said second amount; and (e) display means responsive to said signal, the display means providing a numerical indication of temperature in degrees Fahrenheit in response to the first frequency or a numerical indication of temperature in degrees Celsius in response to the second frequency.

10. Apparatus as defined in claim 9 wherein said means for generating a first predetermined current or a second predetermined current includes: a DC voltage source; a first transistor coupled to said circuit; a second transistor, the emitters of the first and second transistors being coupled to provide a common voltage at the emitters, the bases of the first and second transistors being coupled to the collector of the second transistor; a resistance coupling the collector to the DC voltage source, whereby the first predetermined current flows through the first transistor; and means for changing the resistance coupling the collector to the DC voltage source, whereby the second predetermined current flows through the first transistor.

11. Apparatus as defined in claim 10 further including means for selectively connecting a second capacitor in parallel with the first capacitor.

* * * * *